UNITED STATES PATENT OFFICE.

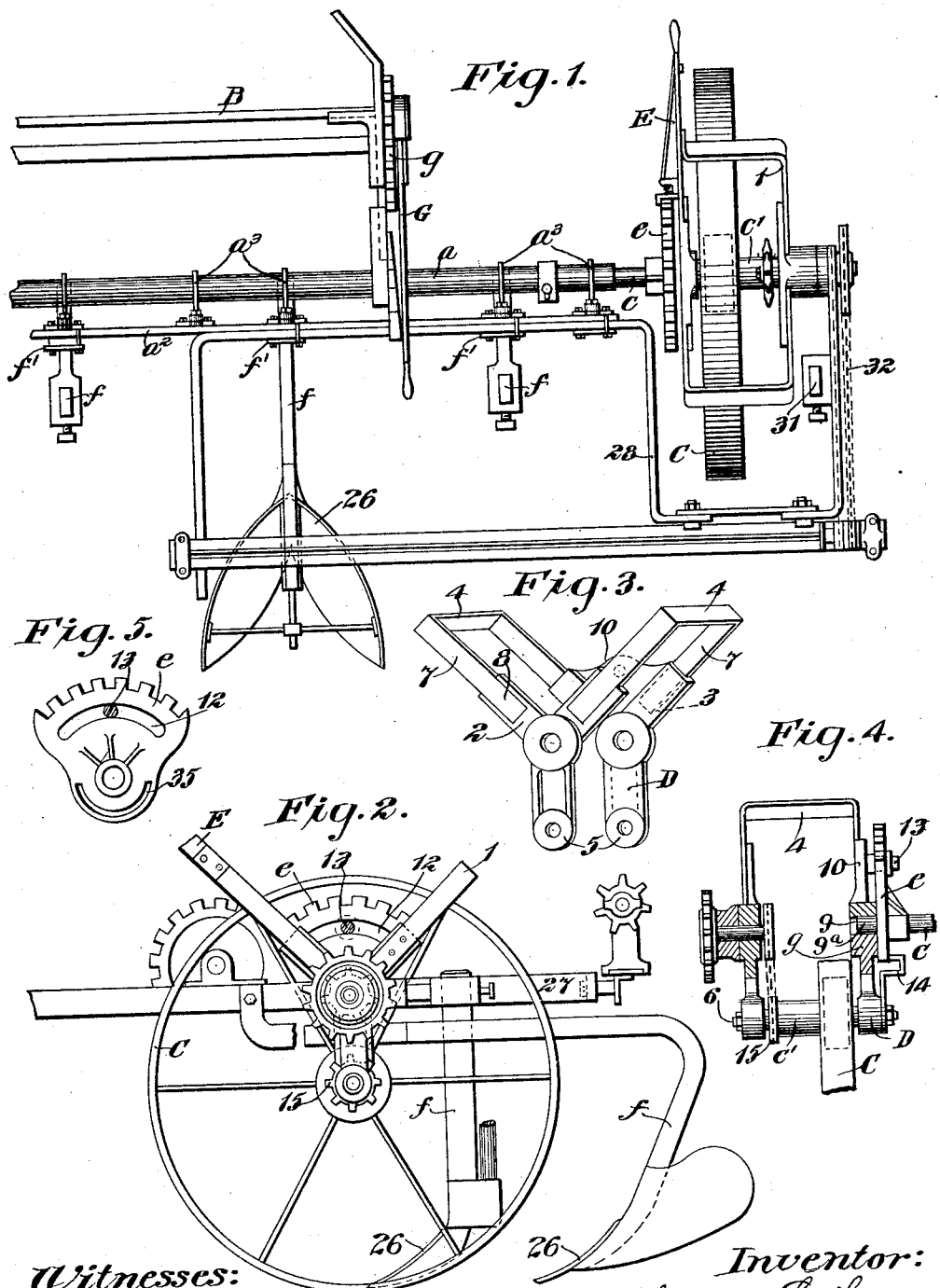

WILLIAM LATHAM, OF KIAMBU, NAIROBI, BRITISH EAST AFRICA.

CULTIVATING-MACHINE.

1,110,393.      Specification of Letters Patent.     Patented Sept. 15, 1914.

Application filed August 21, 1912. Serial No. 716,166.

*To all whom it may concern:*

Be it known that I, WILLIAM LATHAM, a subject of the King of Great Britain and Ireland, and residing at Metropi Vale Farm, Kiaimbu, Nairobi, British East Africa, have invented new and useful Improvements in Cultivators, of which the following is a specification.

This invention relates to improvements in cultivators, its object being to make said cultivators quickly and easily adaptable, in an efficient manner, for forming seed rows at various distances apart.

In the accompanying drawings, Figure 1 shows a portion of my improved cultivating machine in plan, and Fig. 2 shows the same in elevation. Fig. 3 is an isometrical view of the forked sectoral frames in which the traveling wheels are mounted; Fig. 4 shows a cross section of the same, and Fig. 5, illustrates the toothed sector for controlling the relative angle of the traveling wheel centers in relation to the main cylindrical frame member.

The machine illustrated is a laterally extending one. The main frame comprises in this machine as in others of this type, a tubular main frame member $a$, and a parallel bar $a^2$ loosely secured to the tubular member with yokes $a^3$. The fore carriage is represented by B and the main wheels are represented by C. Inside the said tubular member are sliding bars indicated by $c$ which can be extended on each side with the said traveling wheels, and locked in any laterally extending position. The wheel centers are cranked or eccentrically mounted in relation to the tubular member $a$, and by means of a lever handle E which is fixed to the crank D and a notched sector $e$ fixed to the member $a$ and pivoted in the crank, the angle of the latter can be altered, and the blades 26 lowered into the ground to the required working depth. The shanks or standards of the blades 26 represented by $f$ are fixed by means of blocks or clamps $f^1$, to the bar $a^2$, which is connected to the member $a$ as previously stated.

31 indicates the end of a blade shank carried by the rearwardly extending frame members 27 and 28.

Now according to my invention, I employ a sectoral yoke frame 1 Figs. 1 and 2, on each side of the machine, in which the traveling wheels C are mounted. The frame 1, see Figs. 3 and 4, is made with preferably Y-shaped sides 2 and 3, two pairs of the limbs thereof being bridged across at 4 outside the wheel rim and the remaining pair being connected at their ends 5 with the wheel axle 6, see Fig. 4. The yoke frame 1 is conveniently made in parts consisting of two Y-shaped members 7 and the two bridged parts 4 which are bent so as to overlap the Y-members and enable the parts to be clamped together as at 8 see Figs. 3 and 4. The yoke frame is revolubly fixed to the sector $e$ at the junction of the arms of the side 3. In an extending machine the sector $e$ and yoke frame 1 are carried by a sliding bar $c$ fixed to the yoke frame, made to telescope in the frame tube $a$. This may be conveniently carried out by providing a socket 9 on the inside Y-member, see Figs. 3 and 4, in which the pivoted end $9^a$ of the sliding bar $c$ engages. The socket has an ear 10, or a single flange may be used, which bears against the face of the sector $e$ fixed to the sliding bar $c$. The sector $e$ has curved slots 12 and 35 (see Fig. 5) and a bolt or stud 13 fixed to the ear 10 of the socket passes through the slot 12, the end of the stud having a head, nut or collar, to prevent it drawing out. A claw such as 14 fixed to the crank D passes around the lower edge of the sector and into the slot 35 so as to assist the stud 13 to hold the parts 9 and $e$ together. The wheel C may have a long hub $c^1$ on the end of which may be fixed a chain sprocket 15.

The handle E for adjusting the depth at which the blades 26 are to work by means of altering the angle of the crank, is fixed to a yoke frame as shown in Figs. 1 and 2. There is shown in the drawing a handle at each side of the machine each of which has to be separately operated to vary the depth of working the blades, as each crank has to be separately altered The lever handle marked G and the sector $g$ are the usual ones for throwing the blades out of action altogether. This is done in the usual manner by rocking the bar $a^2$ on the member $a$ by means of the handle G fixed to the cross shaft $g^3$, and link work not shown. This arrangement is shown only in plan in Fig. 1, and does not form part of my invention. The rearwardly extending frame carrying the blade shank 31, comprises two laterally extending frame members 27 (see Fig. 2) and 28 (see Fig. 1), one on each side of the machine.

Each member is conveniently shaped, that is to say, one end portion is yoke shaped to pass around the wheel and carry an outside tine 31. The frame members 27 and 28 lie against the bar $a^2$ to which they are clamped with the clamps $f^1$ so that by releasing the clamps they may be slid outwardly along with the wheels C and sectoral frames 1 to extend the width of the machine.

I claim as my invention:

1. In a cultivator, the combination of a main transverse cylindrical frame member, a member parallel therewith and adapted to rock thereon, blade shanks secured to said parallel member, a forked frame fixed to said main frame member at each end, a traveling wheel in each said forked frame and centered eccentrically in relation to said main frame member, a laterally arranged frame member projecting rearwardly and clipped to said parallel member and formed yoke shaped to pass around the wheel and centered at its outer end to the outside of the forked frame, and means for angularly adjusting the wheel center bearings in relation to the said main frame member.

2. In a cultivator, the combination of a main transverse hollow cylindrical frame member, a member parallel therewith and adapted to rock thereon, blade shanks secured to said parallel member, a bar adapted to slide in the main frame member at each end, a forked frame fixed to said bar at each side of the machine, means for fixing said bar in said main frame member, a traveling wheel in each said forked frame and centered eccentrically in relation to said main frame member, a laterally arranged frame member on each side of the machine projecting rearwardly and clipped to said parallel member so as to extend laterally with the said sliding bar, said frame being yoke shaped to pass around the wheel and centered at its outer end to the outside of the forked frame, and means for angularly adjusting the wheel center bearings in relation to said main frame member.

3. In a cultivator, the combination of a main cylindrical frame member, a member angularly adjustable thereon, a forked sectoral frame fixed on each side of the said frame member, a traveling wheel centered in each said forked frame eccentrically in relation to said main frame member, a laterally arranged frame member behind the main frame member and carried around the walls to the outside of the said forked frames, and means for varying the angle of the wheel centers in relation to the main cylindrical frame member substantially as described.

4. In a cultivator, the combination of a main hollow cylindrical frame member, a member at the rear thereof and angularly adjustable thereon, means for angularly adjusting the said member in relation to the main frame member, a bar telescoping into said main hollow cylindrical frame member at each side, a forked sectoral frame fixed to said bar at each side of the machine, means for fixing said forked frames at differently laterally extended positions, a traveling wheel centered in each forked frame eccentrically in relation to said main cylindrical member, a member laterally arranged on each side of the machine and clipped to said angular adjustable member, said members being carried around the walls to the outside of the said forked frames and laterally extensible with the walls, and means for varying the angle of the wall centers in relation to the main cylindrical frame member.

5. In a cultivator, the combination of a main transverse hollow cylindrical frame member, a parallel bar loosely secured to the same, blade shanks fixed to said bar, a telescopic member carrying a traveling wheel on an angle at each end of the said main frame member, means for fixing the said telescopic member in said main frame member on different laterally extended positions, a rearwardly extended member clipped to said parallel bar at each side of the longitudinal center of the machine, and adapted to slide laterally with the traveling wheels, and means for angularly adjusting the wheel centers in relation to the main frame member.

In testimony whereof, I affix my signature in presence of two witnesses.

WILLIAM LATHAM.

Witnesses:
 RIDLEY J. URQUHART,
 FREDERICK HITCHEN.